US010755484B1

(12) United States Patent
Côté

(10) Patent No.: US 10,755,484 B1
(45) Date of Patent: Aug. 25, 2020

(54) ESTIMATING SUBSURFACE FEATURE LOCATIONS DURING EXCAVATION

(71) Applicant: Bentley Systems, Incorporated, Exton, PA (US)

(72) Inventor: Stéphane Côté, Lac Beauport (CA)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 16/104,650

(22) Filed: Aug. 17, 2018

(51) Int. Cl.
*G06T 19/00* (2011.01)
*G06T 17/20* (2006.01)
*G06T 7/73* (2017.01)
*G06T 7/11* (2017.01)
*H04N 5/247* (2006.01)
*B60R 1/00* (2006.01)
*E02F 9/26* (2006.01)
*H04N 5/232* (2006.01)
*H04N 5/04* (2006.01)

(52) U.S. Cl.
CPC .............. *G06T 19/006* (2013.01); *B60R 1/00* (2013.01); *E02F 9/261* (2013.01); *G06T 7/11* (2017.01); *G06T 7/73* (2017.01); *G06T 17/20* (2013.01); *H04N 5/247* (2013.01); *B60R 2300/105* (2013.01); *B60R 2300/303* (2013.01); *G06T 2207/30184* (2013.01); *G06T 2207/30252* (2013.01); *H04N 5/04* (2013.01); *H04N 5/23238* (2013.01)

(58) Field of Classification Search
None
See application file for complete search history.

(56) References Cited

U.S. PATENT DOCUMENTS

| 8,547,428 B1 | 10/2013 | Olsson et al. |
| 9,230,453 B2 | 1/2016 | Van Sickle |
| 9,466,144 B2 | 10/2016 | Sharp et al. |
| 9,715,008 B1 | 7/2017 | Côté et al. |
| 9,881,425 B1 * | 1/2018 | Scott .................... G06T 19/006 |

(Continued)

OTHER PUBLICATIONS

"Augmentation of Road Surfaces with Subsurface Utility Model Projections", by Stephane Cote and Alexandra Mercier, 2018 IEEE Conference on Virtual Reality and 3D User Interfaces, pp. 535-536, Mar. 2018. (Year: 2018).*
"Augmented Reality for Construction Site Monitoring and Documentation", by S. Zollmann, C. Hoppe, S. Kluckner, C. Poglitsch, H. Bischof and G. Reitmayr, Proceedings of the IEEE, vol. 102, No. 2, pp. 137-154, Feb. 2014. (Year: 2014).*

(Continued)

*Primary Examiner* — James A Thompson
(74) *Attorney, Agent, or Firm* — Cesari and McKenna, LLP; James A. Blanchette

(57) ABSTRACT

In one embodiment, techniques are provided for capturing accurate information describing the location of subsurface features (e.g., subsurface utilities such as water pipes, sewer pipes, electrical conduits, etc.) usable in providing an augmented reality view. A set of images is captured with a camera rig coupled to a mobile portion (e.g., the boom) of a piece of heavy construction equipment (e.g., an excavator) being used by workers to conduct an excavation that exposes the subsurface features. The set of images is provided to a structure-from-motion (SfM) photogrammetry that generates a 3D reality mesh. Relative and/or absolute locations of the subsurface features are calculated based on the 3D reality mesh and provided to an augmented reality application executing on an augmented reality device for use in providing an augmented reality view.

20 Claims, 5 Drawing Sheets

(56) References Cited

U.S. PATENT DOCUMENTS

| | | | | |
|---|---|---|---|---|
| 10,259,383 | B1* | 4/2019 | Campbell | B60Q 1/525 |
| 2011/0311342 | A1* | 12/2011 | Montgomery | G01C 21/04 |
| | | | | 414/685 |
| 2012/0127161 | A1* | 5/2012 | Wallbom | G06T 17/05 |
| | | | | 345/419 |
| 2014/0188333 | A1* | 7/2014 | Friend | E02F 9/267 |
| | | | | 701/34.4 |
| 2014/0200863 | A1* | 7/2014 | Kamat | G06T 19/00 |
| | | | | 703/1 |
| 2015/0100235 | A1* | 4/2015 | Jones | G01V 1/34 |
| | | | | 701/468 |
| 2017/0292248 | A1* | 10/2017 | Matson | G01C 9/06 |
| 2017/0323480 | A1* | 11/2017 | LaBarca | G06T 19/006 |
| 2018/0039263 | A1* | 2/2018 | Baiden | G01C 21/12 |
| 2018/0182120 | A1* | 6/2018 | Izumikawa | G01C 11/06 |
| 2018/0196135 | A1* | 7/2018 | Crain | G01S 13/90 |
| 2018/0251961 | A1* | 9/2018 | France | E02F 3/435 |
| 2018/0293801 | A1* | 10/2018 | Metzler | G06T 7/74 |
| 2019/0132576 | A1* | 5/2019 | Zhang | H04N 5/247 |
| 2019/0205647 | A1* | 7/2019 | Kumar | G06K 9/00671 |

OTHER PUBLICATIONS

Cadena, Cesar, et al., "Past, Present, and Future of Simultaneous Localization and Mapping: Toward the Robust-Perception Age," IEEE, IEEE Transactions on Robotics, vol. 32, No. 6, Dec. 2016, pp. 1309-1332.

Faltynova, M., et al., "Building Façade Documentation Using Laser Scanning and Photogrammetry and Data Implementation Into BIM," The International Archives of the Photogrammetry, Remote Sensing and Spatial Information Sciences, vol. XLI-B3, 2016 XXIII ISPRS Congress, Prague, Czech Republic, Jul. 12-19, 2016, pp. 215-220.

Lukss, Ints, et al., "Modern Photogrammetry-Capturing Reality for Geoprocessing," MikroKods, BIM and Beyond-Baltic Tour, Vilnius-Riga-Tallinn, Oct. 18-20, 2016, pp. 1-38.

U.S. Appl. No. 15/709,115, filed Sep. 19, 2017 by Stéphane Côté et al. for Tool for Onsite Augmentation of Reality Meshes, pp. 1-27.

Westoby, M.J., et al., "'Structure-from-Motion' photogrammetry: A low-cost, effective tool for geoscience applications," Elsevier B.V., Geomorphology, vol. 179, Sep. 6, 2012, pp. 300-314.

\* cited by examiner

ESTIMATING SUBSURFACE FEATURE LOCATIONS DURING EXCAVATION

BACKGROUND

Technical Field

The present disclosure relates to augmented reality, and more specifically to techniques for capturing accurate information describing the location of subsurface features usable in providing an augmented reality view.

Background Information

Excavation work (e.g., road excavation work) often creates traffic disruptions that inconvenience local residents and harm the local economy. Further, there is potential of injury should mistakes occur. Accordingly, it is important to carefully plan such work, so that it can be conducted efficiently and safely. Traditionally, excavation work has been planned in the field using paper plans, where a worker looks at the plans and the physical environment (e.g., the road surface), and manually determines where subsurface features (e.g., subsurface utilities such as water pipes, sewer pipes, electrical conduits, etc.) are located. More recently, there has been research into using augmented reality for excavation work, to permit a worker to see a computer-generated visualization of subsurface features imposed upon a view of the physical environment.

In a typical adaptation of augmented reality technology to excavation work, a worker may hold or wear an augmented reality device, such as a head-mounted display unit (e.g., the Microsoft HoloLens® head-mounted display unit). An augmented reality application executing on the device uses a camera to capture a stream of images of the physical environment. A pose determination system (e.g., a number of position and orientation sensors and supporting software) determines the pose of the camera. Based on the pose, the application aligns information that describes subsurface features (e.g., a 3-D model, a 2-D map or drawing, etc.) with the images of the physical environment, and augments the images of the physical environment based thereon. In some implementations, the augmentations take the form of renderings of subsurface features at their actual locations made visible via a virtual excavation in the terrain surface. In other implementations, the augmentations take the form of virtual paint markings upon the terrain surface (e.g., the road surface) generated from projections from the locations of subsurface features. A wide variety of other augmentations are also possible. Regardless, for the augmentations to be meaningful, they must be based on accurate information describing the locations of subsurface features. If the locations are unreliable, the augmentations cannot be trusted.

Unfortunately, accurate information describing the locations of subsurface features is typically scarce. Older maps and drawings of existing utility networks may lack necessary detail, and may not reflect in-field changes made to the network. Even drawings for new utility networks signed off by engineers in the field often do not show the true locations of the subsurface utilities. Typically, this is because no one precisely determines the locations where subsurface utilities are actually installed. Ideally, to precisely determine locations a survey is conducted by survey personnel. However, having survey personal on-site to conduct these surveys adds expense, and generally is not standard practice for new construction in many areas.

Determining the precise locations of older subsurface features (e.g., subsurface utilities) can be even more burdensome. Subsurface features are typically hidden from view, and only revealed through excavation work. A comprehensive survey of an existing utility network typically would require a massive amount of excavation (e.g., many entire streets being dug up), which would be very expensive and otherwise impractical.

Portions of existing utility networks are often revealed for short periods of time during routine maintenance or repair work, being excavated and then reburied shortly thereafter when the maintenance/repair is complete. During the brief time window when the utilities are visible they theoretically could be surveyed. Even though only a very small portion of the entire network is revealed at any given time, a series of partial surveys could progressively improve the accuracy of available location information. However, having survey personal ready for conducting such surveys would be quite expensive. Excavation workers typically do not know the exact times subsurface utilities will become visible. Survey personnel would therefore have to be always on-site, available at a minutes notice, so as to not slow down the progress of the maintenance/repair work. Due to these burdens, partial surveys are rarely conducted in practice.

Other techniques could potentially be tried to precisely determine the locations of new or exiting subsurface features (e.g., subsurface utilities). For example, during an excavation, when a subsurface feature is visible, a laser scanner could be used. However, techniques involving a laser scanner suffer from similar disadvantages to techniques involving survey equipment. Laser scanners typically require specialized personnel to operate, and these personnel (like survey personnel) would have to be always on-site, adding expense and hindering new construction or maintenance/repair workflow. Further, laser scanners themselves are quite expensive.

Indirect measurement techniques could be attempted that do not require excavation. For example, techniques involving ground penetrating radar, electromagnetic sensors or inferences based on surface features (e.g., inferring sewer pipe locations from manhole covers in a road, etc.) could be attempted. However, such techniques also suffer shortcomings. Techniques based on ground penetrating radar or electromagnetic sensors may not be suited for all types of soil and may have depth limitations. Further, they typically require specialized personnel and expensive equipment. Further, techniques based on inferences generally cannot provide the level of accuracy desired.

Accordingly, there is a need for new techniques for capturing accurate information describing the locations of subsurface features (e.g., subsurface utilities) that could be used to enable augmented reality. Preferably, such techniques would not require specialized personnel, and would be low cost, such that they could be widely integrated into typical excavation workflows.

SUMMARY

Techniques are provided for capturing accurate information describing the locations of subsurface features (e.g., subsurface utilities such as water pipes, sewer pipes, electrical conduits, etc.) usable in providing an augmented reality view. In one embodiment, a set of images is captured with a camera rig coupled to a mobile portion (e.g., the boom) of a piece of heavy construction equipment (e.g., an excavator) being used by workers to conduct an excavation where the features are exposed (e.g., during installation of new subsurface utilities or repair/maintenance of existing subsurface utilities). The camera rig includes one or more cameras (e.g., two panoramic cameras directed horizontally in opposing directions to either side of the boom and two standard field-of-view cameras directed downwards under the boom) that capture images of the subsurface features and elements of the surrounding physical environment (e.g., surrounding buildings, roadways, etc.) that may have known geographic locations. The set of images are provided to a structure-from-motion (SfM) photogrammetry application executing on an electronic device (e.g., computer) that automatically generates a three-dimensional (3D) reality mesh (i.e. a 3D model based on data captured from the real world) from the set of images. Accurate relative locations of the subsurface features with respect to the elements of the surrounding physical environment may be directly measured from the 3D reality mesh. When known geographic locations are available for the elements of the surrounding physical environment, accurate absolute locations of the subsurface features may be calculated by combining the relative locations and the known geographic locations. The locations (either relative or absolute, as the case may be) of the subsurface features may be stored on the electronic device, and upon demand provided to an augmented reality application executing on an augmented reality device for use in providing an augmented reality view. The augmented reality view may include augmentations (e.g., renderings of subsurface features visible via a virtual excavation, virtual paint markings upon the terrain surface, etc.) based on the provided locations.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The application refers to the accompanying drawings of example embodiments, of which.

DETAILED DESCRIPTION

Figure 1:
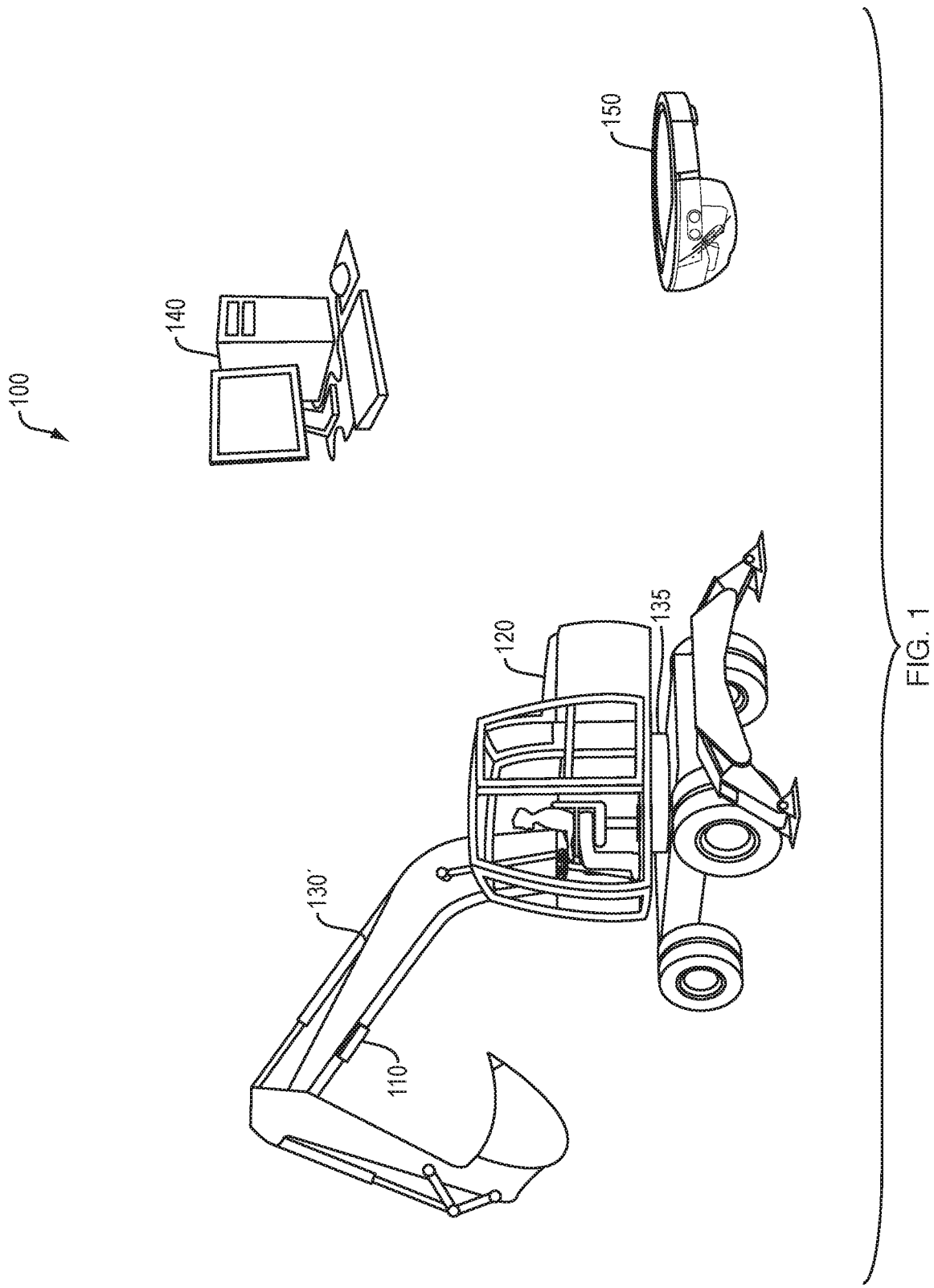
FIG. 1 is a diagram of an example system for capturing accurate information describing the location of subsurface features (e.g., subsurface utilities such as water pipes, sewer pipes, electrical conduits, etc.) usable in providing an augmented reality view.

FIG. 1 is a diagram of an example system 100 for capturing accurate information describing the location of subsurface features (e.g., subsurface utilities such as water pipes, sewer pipes, electrical conduits, etc.) usable in providing an augmented reality view. The system 100 includes a camera rig 110 coupled to a mobile portion of a piece of heavy construction equipment 120. The camera rig 110 may be battery powered, or source electrical current from the piece of heavy construction equipment 120. In one implementation, the piece of heavy construction equipment is an excavator and the mobile portion is a boom 130 (or more specifically a forward portion of the boom) of the excavator. The camera rig 110 is configured to capture a set of images of subsurface features revealed during an excavation and elements of the surrounding physical environment, such as surrounding buildings, roadways, etc., about the site of the excavation.

The system further includes an electronic device 140 (e.g., a computer) configured to executed software, including a SfM photogrammetry application, and maintain a database of known geographic locations of environmental feature and a database of calculated subsurface feature locations. In one implementation, the SfM photogrammetry application may be the Context Capture™ application available from Bentley Systems, Inc. The SfM photogrammetry application is configured to use the set of images from the camera rig 120 to generate a 3D reality mesh (i.e. a 3D polygonal mesh based on data captured from the real world). Additional software may be used to determine locations (e.g., either relative or absolute) of subsurface features from the 3D reality mesh which are stored in the database of subsurface feature locations. The electronic device 140 may be located at a remote location (e.g., an office building) and the set of images may be transferred from the camera rig 110 to the electronic device 140, via a removable storage media (e.g., a flash drive), via a computer network (not shown), or other data transfer technique.

The system further comprises an augmented reality device 150 configured to execute an augmented reality application. The augmented reality device 150 may be a head-mounted display unit (such as the Microsoft HoloLens® head-mounted display unit), a tablet computer, or another type of mobile device. The augmented reality application utilizes the locations from the database of subsurface feature locations, in combination with data from other sources, to generate and position augmentations that describe the subsurface features.

The number, type and placement of the cameras of the camera rig 110 on the piece of heavy construction equipment 120 may be selected to enable capture of a set of images suitable for use by the SfM photogrammetry application, while minimizing the likelihood of damage to the cameras or limitations to operation. In general, SfM photogrammetry relies on camera movement to determine structure, and thereby the camera rig 110 should be coupled to a portion of the piece of heavy construction equipment 120 that is frequently in motion in order to yield a set of images of use to the SfM photogrammetry application. Further, to avoid damage to the cameras from debris impacts (rock, dirt, water, etc. impacts) the camera rig 110 should be located away from working portions of the piece of heavy construction equipment (e.g., away from the bucket of an excavator). Likewise, so as to not hinder motion of the piece of heavy construction equipment 120, the camera rig 110 should be located away from flexion points or other movable parts, with which it may interfere. In an embodiment where the piece of heavy construction equipment 120 is an excavator, coupling the camera rig 110 to the boom (or more specifically, a forward portion of the boom) may satisfy these objectives. During a typical excavation, an excavator rotates frequently about its slew ring 135. Each such rotation will cause the camera rig 110 to move through an arc capturing images from differing locations along the arc. Combined with other movements of the excavator 120, this may be sufficient motion to enable SfM photogrammetry.

The quality of a 3D reality mesh produced by SfM photogrammetry, and the ability to measure/calculate locations of the subsurface features therefrom, may depend on the cameras utilized in the camera rig 110. Cameras with high angular resolution may capture images that permit generation of a high quality 3D reality mesh. Cameras with a wide field of view (but, in turn, a lower angular resolution) may permit broad coverage of the surrounding physical environment, capturing more elements that may be used as a reference to measure relative locations or calculate absolute locations of subsurface features. In an embodiment where the piece of heavy construction equipment 120 is an excavator, the camera rig 110 may include two standard field-of-view (e.g. 90° ) 4 K resolution (4 K) 30 frames-per-second (fps) video cameras directed downwards from the boom towards the excavation and two panoramic (e.g., 180° ) 4 K video 30 fps cameras directed horizontally in opposing directions to the side of the boom. Such an arrangement may achieve the above discussed objectives.

Figure 2A:
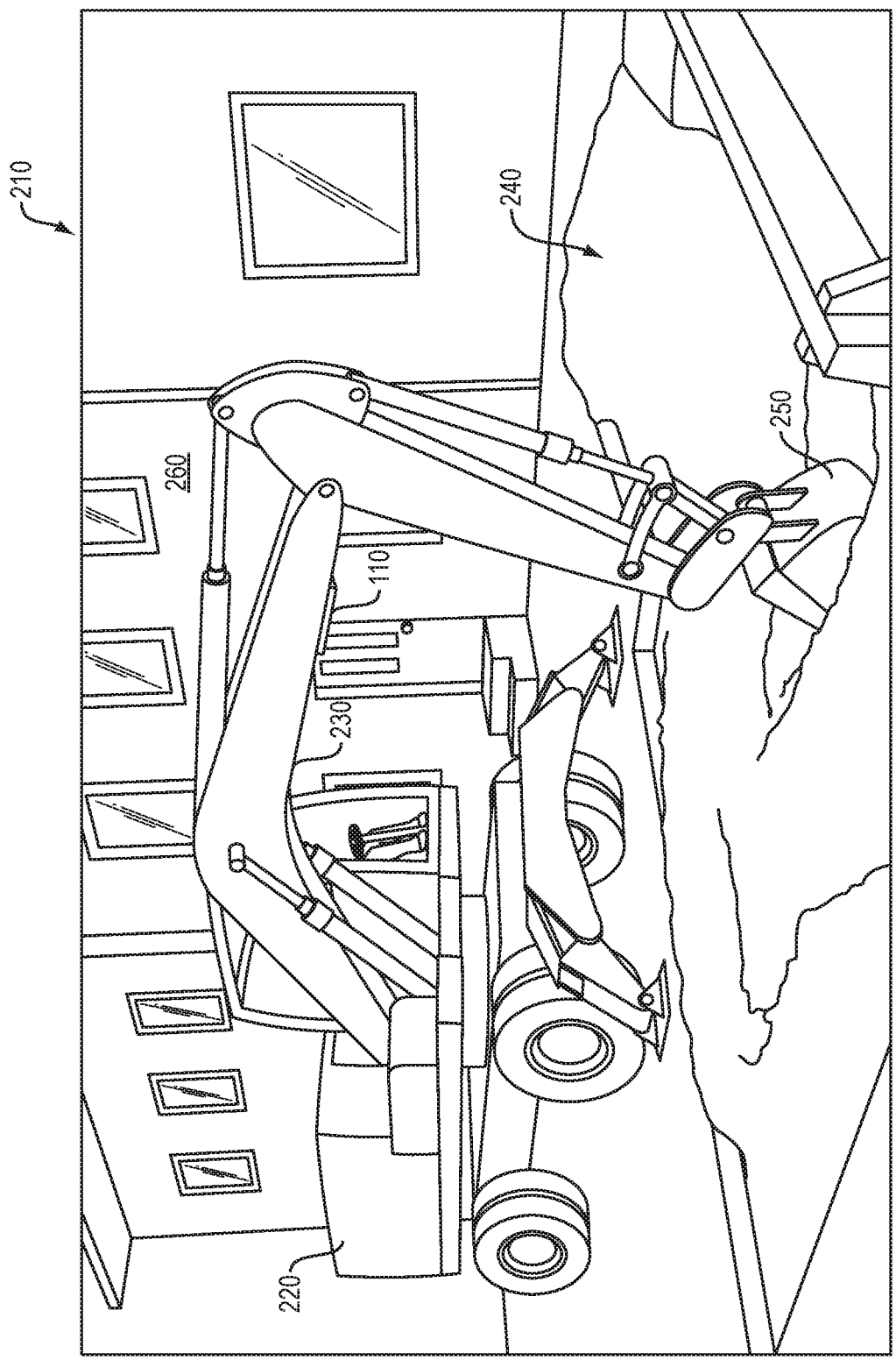
FIGS. 2A and 2B are diagrams showing an example camera rig mounted to the boom of an excavator, capturing a set of images during an excavation.
Figure 2B:
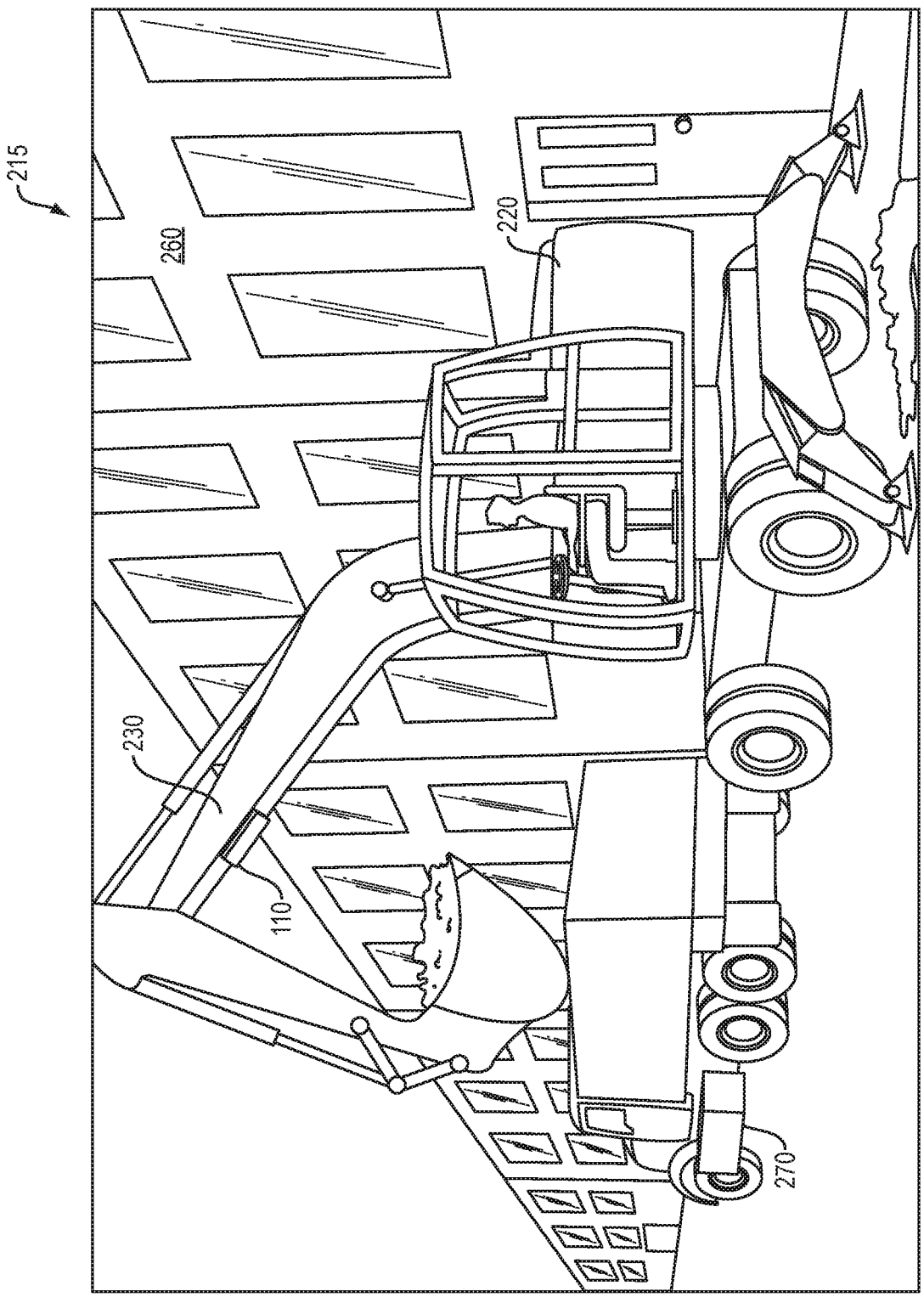

FIGS. 2A and 2B are diagrams 210, 215 showing an example camera rig 110 mounted to the boom 230 of an excavator 220, capturing a set of images during an excavation. FIG. 2A shows the excavator 220 in a first position, with the boom 230 extended over an excavation 240, while a bucket 250 of the excavator collects soil. In this position, the two downward-directed standard field-of-view cameras of the camera rig 110 are pointed substantially directly into the excavation, and are capturing images of any subsurface features that are revealed. The two horizontally-directed panoramic cameras are pointed substantially to either side of the roadway, and capture the buildings 260 located on either side of the road, which may serve as references. FIG. 2B shows the excavator 220 in a second position, with the boom 230 partially rotated towards a dump truck 270, preparing to unload soil from the bucket 250 therein. In this position, the two downward-directed standard field-of-view cameras of the camera rig 110 are pointed substantially towards a portion of the roadway adjacent to the excavation, while the two horizontally-directed panoramic cameras are pointed substantially along the roadway. In this position, both sets of cameras may capture information about the roadway surface (e.g., manhole covers, markings, etc.) that may serve as references.

Figure 3:
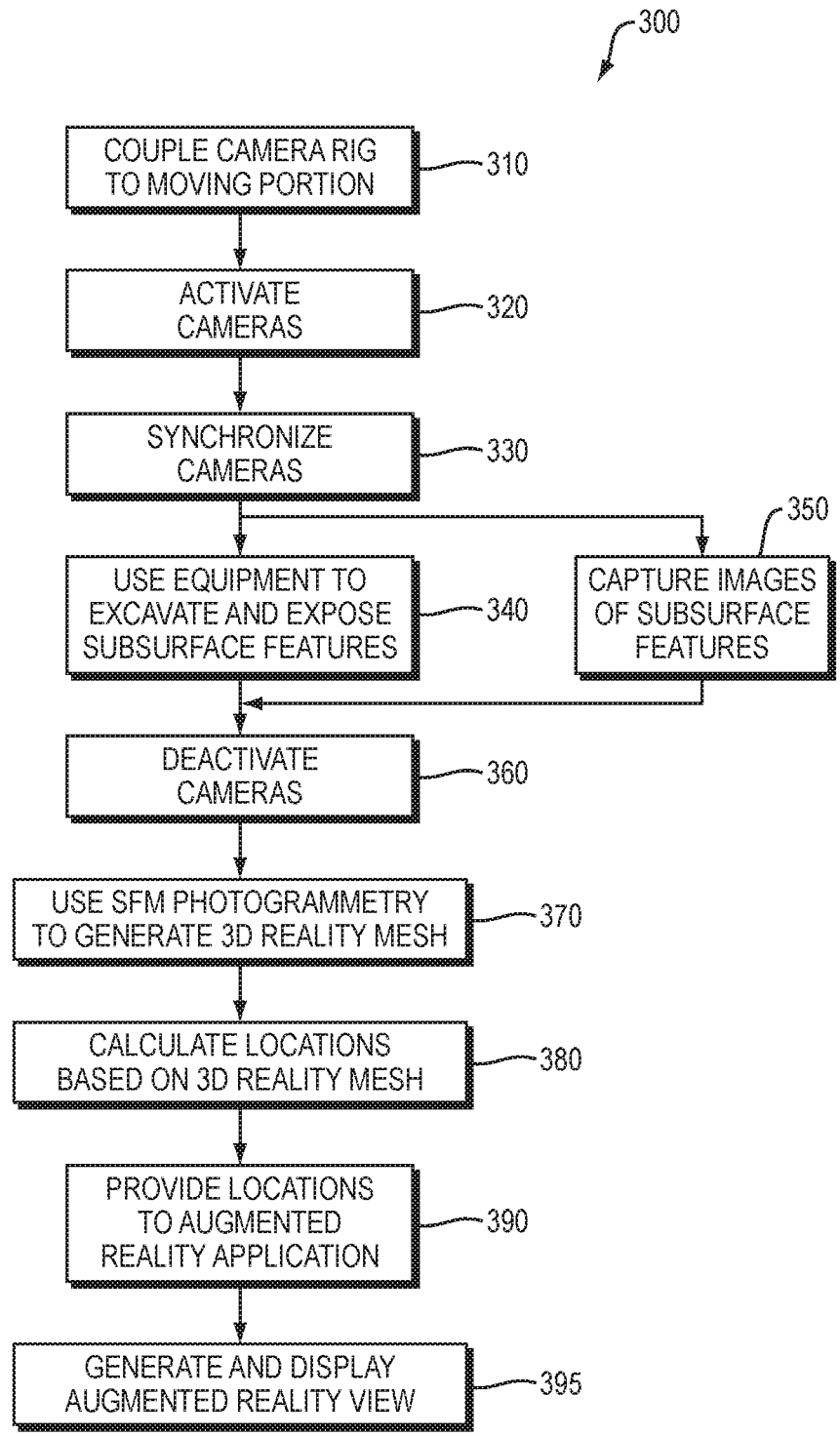
FIG. 3 is a flow diagram of an example sequence of steps for capturing information describing locations of subsurface features and using the locations to provide an augmented reality view.

FIG. 3 is a flow diagram of an example sequence of steps 300 for capturing information describing locations of subsurface features and using the locations to provide an augmented reality view. At step 310, the camera rig is coupled to a moving portion (e.g., the boom) of a piece of heavy construction equipment (e.g., excavator). At step 320, the cameras of the camera rig 110 are activated. Activation may be performed by an excavation worker flipping a switch, pressing a "start capture" button, or other simple action that does not require specialized training. The excavation worker may activate the cameras before the excavation has begun, or at a later stage of the excavation (e.g., when approaching subsurface features), such that non-relevant parts to that excavation process (e.g., the asphalt removal stages) are not captured, conserving memory and/or network resources. The cameras may be configured continuously capture images once activated, or capture images only in response to a trigger, such as the detection of movement based on an inertial sensor, orientation sensor, accelerometer or other device. Such motion-based capture may further conserve memory and/or network resources.

At step 330, the cameras of the camera rig 110 are synchronized. The cameras may be configured to intercommunicate with each other and automatically synchronize, such that they each begin to capture images at the same instant in time. Alternatively, synchronization may involve establishing a synchronization marker and post processing. For example, a visual indicator (e.g., a flashing light) or sound indicator (e.g., a loud noise) may be produced either automatically or manually, and such synchronization marker recorded in the stream of images produced by each camera. Subsequently, in a post processing operation (not shown in FIG. 3) that may be performed by software on the electronic device (e.g., computer) 140 prior to SfM photogrammetry operations, the streams of images from each camera may be aligned in time. Synchronization simplifies use of images from multiple cameras in SfM photogrammetry, and is required by some SfM photogrammetry applications.

At step 340, the excavation worker uses the piece of heavy construction equipment to excavate and expose subsurface features. At step 350, which occurs simultaneously to step 340, the cameras of the camera rig 110 capture images of the subsurface features and elements of the surrounding physical environment to produce the set of images. At step 360, the cameras of the camera rig 110 are deactivated, for example, upon completion of the excavation or when sufficient images have been collected. Deactivation may be performed by an excavation worker flipping a switch, pressing a "stop capture" button, or other simple action that does not require specialized training.

The set of images are transferred to the electronic device (e.g., computer) 140 via a removable storage media, a computer network, or other data transfer techniques. Should any post processing operations be required prior to SfM photogrammetry, they are then performed by the software on the electronic device 140. At step 370, the SfM photogrammetry application on the electronic device 140 generates a 3D reality mesh using the images of the set. Details of how this may be performed are discussed below in reference to FIG. 4.

At step 380, software on the electronic device 140 calculates either relative or absolute locations of the subsurface features based on the 3D reality mesh. Relative locations of the subsurface features with respect to the elements of the surrounding physical environment may be directly measured from the 3D reality mesh. Absolute locations of the subsurface features may be calculated by determining relative locations to the elements of the surrounding physical environment, accessing a database of known geographic locations of environmental features, and then combining the relative locations and the known geographic locations. The locations of subsurface feature are then stored in the database of subsurface feature locations on the electronic device 140.

At step 390, which typically occurs at a subsequent time, the locations of subsurface feature are provided to an augmented reality application executing on an augmented reality device 150. At step 395, an augmented reality application executing on the augmented reality device uses this data to generate and display an augmented reality view includes augmentations at locations based on the provided locations of subsurface features.

Figure 4:
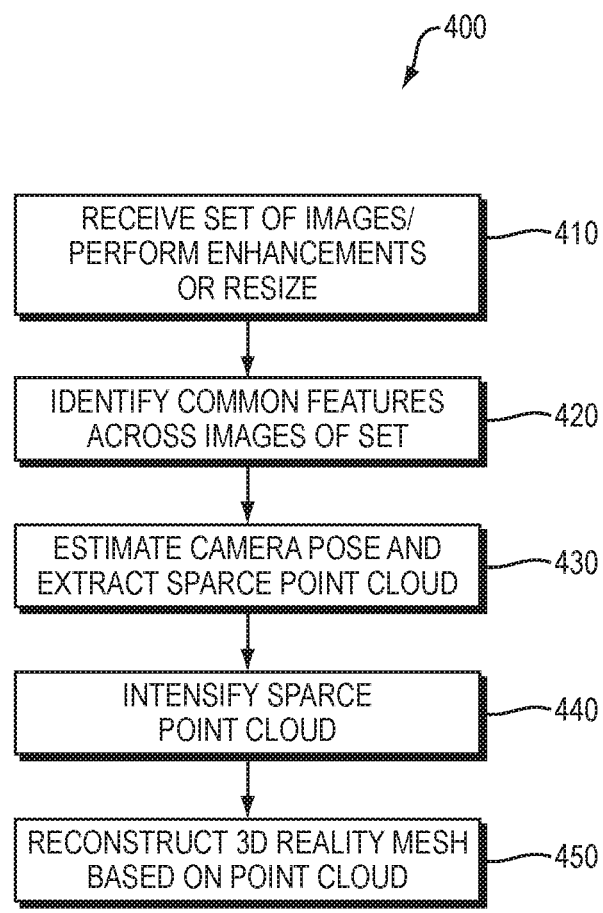
FIG. 4 is a flow diagram of an example sequence of steps that may be performed by a SfM photogrammetry application to generate a 3D reality mesh from a set of images from cameras of a camera rig.

FIG. 4 is a flow diagram an example sequence of steps which may be performed by the SfM photogrammetry application as part of step 370 of FIG. 3 to generate a 3D reality mesh from the set of images from cameras of the camera rig 110. At step 410, the SfM photogrammetry application receives the set of images and performs any necessary enhancements or resizing thereto to improve image quality, to reduce processing times to is acceptable durations, or achieve other objectives. At step 420, the SfM photogrammetry application identifies common features in individual images across the set of images sufficient to establish spatial relationships. One algorithm that may be used to identify common features is a scale invariant feature transform (SIFT) algorithm that identifies keypoints in images that are invariant to image scaling and rotation and at least partially invariant to changes in illumination conditions and camera viewpoints. The SIFT algorithm may assign descriptors computed by transforming local image gradients into a representation that is largely insensitive to variations in illumination and orientation.

At step 430, the SfM photogrammetry application estimates camera pose for images of the set of images and extracts a low-density or "sparse" point cloud. One algorithm that may be used to extract the sparse point cloud is a sparse bundle adjustment algorithm. The sparse bundle adjustment algorithm may match keypoints in multiple images and produce "tracks" linking specific keypoints. Correspondences between keypoints place constraints on camera poses. With camera poses determined, triangulation can then be used to estimate 3-D point positions and incrementally reconstruct geometry.

At step 440, the SfM photogrammetry application intensifies the sparse point cloud to produce a high-density point cloud. Such intensification may involve multi-view stereo (MVS) techniques. Such MVS techniques may enable generation of a very high resolution dataset, whilst isolating and removing gross errors.

Then, at step 450, the SfM photogrammetry application reconstructs a 3D reality mesh from the high-density point cloud and returns a 3D reality mesh. Various algorithms may be used in performing the reconstruction, such as a Poisson surface reconstruction algorithm or 3D Delaunay triangulation algorithm. In some cases, the 3D reality mesh may be a multi-resolution 3D reality mesh that represents the subsurface features and elements of the surrounding physical environment at a number of different resolutions or levels of detail (LODs).

In conclusion, the above description discusses example techniques for capturing accurate information describing the location of subsurface features usable in providing an augmented reality view. It should be understood that a number of modifications and/or additions may be made without departing from the disclosure's intended spirit and scope. While it is described that the locations may be used in providing an augmented reality view, it should be understood that the locations may be used for other purposes. Further, in some cases, the 3D reality mesh may be used for purposes other than, or in addition to, location determination.

One possible variant of the techniques may involve generating an evolving 3D reality mesh that depicts an excavation at various stages of completion. It may be desirable to display such an evolving 3D reality mesh on the electronic device 140, another electronic device, or the augmented reality device 150, in order to better understand aspects of the excavation or the subsurface features revealed. To produce an evolving 3D reality mesh the set of image may be segmented into scenes. In one implementation, each rotation of the piece of heavy construction equipment (e.g., excavator 120) to unload soil (e.g., from the bucket 250) may be defined a separate scene. The scenes are then processed independently by the SfM photogrammetry application to produce a plurality of 3D reality meshes, which can be displayed in sequence, to produce an evolving display that appears somewhat similar to time-lapse photography.

A wide variety of other variants of the techniques are also possible. It should be understood that many of the above discussed techniques may be implemented in software, in hardware, or in a combination thereof. A software implementation may include electronic device-executable instructions stored in a non-transitory electronic device-readable medium, such as a volatile or persistent memory, a hard-disk, a compact disk (CD), or other storage medium. A hardware implementation may include specially configured processors, application specific integrated circuits (ASICs), and/or other types of hardware components. Further, a combined software/hardware implementation may include both electronic device-executable instructions stored in a non-transitory electronic device-readable medium, as well as one or more specially configured hardware components. Above all, it should be understood that the above descriptions are meant to be taken only by way of example.

What is claimed is:

1. A method for capturing information describing locations of subsurface features usable in providing an augmented reality view:
    coupling a camera rig to a moving portion of a piece of heavy construction equipment, the camera rig includes one or more cameras;
    conducting an excavation that exposes the subsurface features using the piece of heavy construction equipment, wherein precise locations of the subsurface features are unknown;
    capturing images of the subsurface features and elements of the surrounding physical environment using the camera rig during the excavation;
    generating, by a structure-from-motion (SfM) photogrammetry application executing on an electronic device, a three-dimensional (3D) reality mesh using the captured images from the camera rig, wherein the 3D reality mesh is a 3D polygonal mesh based on data included in camera images captured from the real world;
    for the subsurface features whose precise locations are unknown, calculating at least one of relative or absolute locations of the subsurface features based on the 3D reality mesh; and
    providing the calculated relative or absolute locations of the subsurface features to an augmented reality application executing on an augmented reality device for use in providing an augmented reality view.

2. The method of claim 1, wherein the moving portion of the piece of heavy construction equipment is the boom of an excavator.

3. The method of claim 1, wherein the subsurface features comprise subsurface utilities.

4. The method of claim 1, wherein the camera rig includes a plurality of cameras.

5. The method of claim 4, wherein the plurality of cameras includes two panoramic cameras directed horizontally in opposing directions and two standard field-of-view cameras directed downwards towards the excavation.

6. The method of claim 4, further comprising:
    synchronizing the plurality of cameras.

7. The method of claim 6, wherein the synchronizing comprises starting capture of the stream of images on each camera at a same time.

8. The method of claim 6, wherein the synchronizing comprises providing a synchronization marker in each stream of images and aligning the streams of images based on the synchronization marker.

9. The method of claim 1, wherein the calculating calculates a relative location of the subsurface features, wherein the relative location is with respect to one or more of the elements of the surrounding physical environment.

10. The method of claim 1, wherein one or more of the elements of the surrounding physical environment have a known geographic location, and the calculating calculates an absolute location of the subsurface features by combining a relative location of the subsurface features with the known geographic location of the one or more elements.

11. The method of claim 1, further comprising:
displaying, on the augmented reality device, the augmented reality view to a user, wherein the augmented reality view includes augmentations at locations based on the calculated relative or absolute locations.

12. A method for capturing information describing locations of subsurface features:
coupling a camera rig to a moving portion of a piece of heavy construction equipment, the camera rig includes one or more cameras;
conducting an excavation that exposes the subsurface features using the piece of heavy construction equipment, wherein precise locations of the subsurface features are unknown;
capturing images of the subsurface features and elements of the surrounding physical environment using the camera rig during the excavation; and
generating, by a structure-from-motion (SfM) photogrammetry application executing on an electronic device, a three-dimensional (3D) reality mesh using the captured images from the camera rig, wherein the 3D reality mesh is a 3D polygonal mesh based on data included in camera images captured from the real world.

13. The method of claim 12, further comprising:
calculating at least one of relative or absolute locations of the subsurface features based on the 3D reality mesh; and
storing the calculated relative or absolute locations of the subsurface features.

14. The method of claim 13, further comprising:
providing the calculated relative or absolute locations of the subsurface features to an augmented reality application executing on an augmented reality device; and
displaying, on the augmented reality device, an augmented reality view, wherein the augmented reality view includes augmentations at locations based on the calculated relative or absolute locations.

15. The method of claim 12, wherein the generating further comprises:

segmenting the images from the camera rig into two or more scenes; and
processing each scene independently by the SfM photogrammetry application to produce a plurality of 3D reality meshes.

16. The method of claim 15, further comprising:
displaying, on the electronic device or another electronic device, an evolving 3D display based on the plurality of 3D reality meshes.

17. The method of claim 12, wherein the moving portion of the piece of heavy construction equipment is the boom of an excavator.

18. The method of claim 12, wherein the subsurface features comprise subsurface utilities.

19. A system for capturing information describing locations of subsurface features:
a camera rig coupled to a moving portion of a piece of heavy construction equipment, the camera rig configured to capture images of the subsurface features and elements of the surrounding physical environment during an excavation performed using the piece of heavy construction equipment, wherein precise locations of the subsurface features are unknown; and
an electronic device configured to execute a structure-from-motion (SfM) photogrammetry application, the SfM photogrammetry application when executed operable to:
receive the captured images from the camera rig,
generate a three-dimensional (3D) reality mesh using the captured images from the camera rig, wherein the 3D reality mesh is a 3D polygonal mesh based on data included in camera images captured from the real world, and
calculate, for the subsurface features whose precise locations are unknown, at least one of relative or absolute locations of the subsurface features based on the 3D reality mesh.

20. The system of claim 19 further comprising:
an augmented reality device configured to execute an augmented reality application, the augmented reality application when executed operable to:
display an augmented reality view that includes augmentations at locations based on the calculated relative or absolute locations.

* * * * *

UNITED STATES PATENT AND TRADEMARK OFFICE
CERTIFICATE OF CORRECTION

PATENT NO. : 10,755,484 B1  
APPLICATION NO. : 16/104650  
DATED : August 25, 2020  
INVENTOR(S) : Stéphane Côté

Page 1 of 1

It is certified that error appears in the above-identified patent and that said Letters Patent is hereby corrected as shown below:

In the Specification

Column 2, Line 18 reads:  
"able at a minutes notice, so as to not slow down the progress"  
Should read:  
--able at a minute's notice, so as to not slow down the progress--

Column 2, Line 22 reads:  
"determine the locations of new or exiting subsurface features"  
Should read:  
--determine the locations of new or existing subsurface features--

Column 6, Line 66 reads:  
"image quality, to reduce processing times to is acceptable"  
Should read:  
--image quality, to reduce processing times to acceptable--

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*